Figures 1, 2:
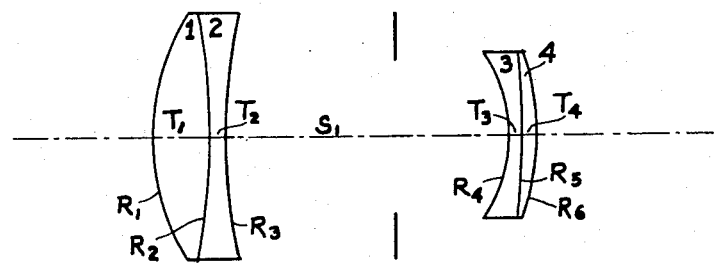

Nov. 6, 1956     D. C. GILKESON     2,769,371

TELEPHOTO OBJECTIVE LENS COMPRISING FOUR ELEMENTS

Filed July 25, 1955

| EF = 100 mm. | | | | f: 5.6 |
|---|---|---|---|---|
| Lens | N | V | Radii | Thicknesses |
| 1 | 1.5725 | 56.8 | $R_1 = +18.1$ mm. | $T_1 = 4.2$ mm. |
| 2 | 1.649 | 33.8 | $R_2 = -51.0$ | $T_2 = 1.6$ |
|   |        |      | $R_3 = +44.5$ | $S_1 = 21.7$ |
| 3 | 1.500 | 67.0 | $R_4 = -11.3$ | $T_3 = 1.1$ |
| 4 | 1.605 | 43.6 | $R_5 = -58.3$ | $T_4 = 1.1$ |
|   |        |      | $R_6 = -19.5$ | $BF = 51.2$ |

United States Patent Office 2,769,371
Patented Nov. 6, 1956

2,769,371

TELEPHOTO OBJECTIVE LENS COMPRISING FOUR ELEMENTS

David C. Gilkeson, Irondequoit, N. Y., assignor to Wollensak Optical Company, Rochester, N. Y., a corporation of New York Application July 25, 1955, Serial No. 523,995

1 Claim. (Cl. 88—57)

This invention relates to a telephoto lens for aerial photography.

An object of the invention is to provide a generally improved and more satisfactory lens for this purpose.

Another object is to provide a satisfactory telephoto lens having higher resolving power than comparable lenses of the prior art.

Still another object is the provision of a telephoto lens having the simplest practicable construction meeting a requirement of resolving power of 23 lines per millimeter on the basis of area weighted average resolution.

A further object is to provide a simple and practical telephoto lens which is highly corrected for spherical aberration, coma, astigmatism, oblique spherical aberration, curvature of field, longitudinal color, chromatic difference of magnification, sphero-chromatism, and distortion, over a total angular field of 30 degrees.

A still further object is to provide a telephoto lens which, in a reasonable size and at reasonable cost, will give adequate coverage over a negative size of 4½ x 4½ inches, sufficiently well to meet the high resolution requirements and correction requirements imposed by the needs of the armed forces.

These and other desirable objects may be attained in the manner disclosed as an illustrative embodiment of the invention in the following description and in the accompanying drawings forming a part hereof, in which:

Fig. 1 is a diagrammatic view of a lens in accordance with a preferred embodiment of the present invention; and Fig. 2 is a table of numerical data with respect to one specific embodiment of such a lens.

For certain purposes of aerial photography, the armed forces require a telephoto lens which is highly corrected for all factors important in modern aerial photography, including spherical aberration, oblique spherical aberration, astigmatism, coma, curvature of field, chromatic difference of magnification, longitudinal color, and sphero-chromatism, as well as distortion, over a total angular field of not less than 30°. At the same time, such a lens must meet the rather severe requirement of resolving power of 23 lines per millimeter, on the basis of area weighted average resolution (such basis being sometimes abbreviated AWAR). Prior lenses comparable to the present one, so far as known at present, have not been able to attain resolution better than about 15 to 20 lines per millimeter, AWAR.

According to the present invention, it is found that the above mentioned requirements can be met by a four element lens consisting of a positive meniscus doublet at the front and a negative meniscus doublet in rear thereof, the two lens elements of each doublet being either cemented to or air spaced from each other, cementing being preferred. The concave faces of both doublets face the stop or diaphragm, and are separated from each other by a space in the range of 0.20 to 0.25 times the focal length of the system. The power of the positive doublet is from 1.6 to 1.9 times the total power of the system. The power of the negative doublet is from −0.75 to −0.90 times the power of the system, and from −0.6 to −0.75 times the power of the positive doublet.

Numerical data for a specific example of a lens fulfilling the above conditions and meeting all of the above mentioned requirements are given in Fig. 2 of the drawing and are repeated for convenience in the following table. The lens elements are numbered in the customary manner from front to rear. The refractive indices N in this table and elsewhere throughout the specification are expressed with reference to the D line of the spectrum. The column V gives the dispersive indices. The radii of curvature R, the axial thicknesses T of the lens elements, and the spacing S between elements, are all expressed in the customary manner, with the usual subscripts indicating the particular surface, lens thickness, or air space, numbered in sequence from front to rear. The plus and minus values of the radii R indicate surfaces respectively convex and concave toward the front. The values of R, T, and S are, as customary, expressed in millimeters for a lens having an equivalent focal length or EF of 100 millimeters, and may be varied proportionately for lenses of longer or shorter focal length.

| Lens | N | V | Radii, mm. | Thicknesses, mm. |
|---|---|---|---|---|
| 1 | 1.5725 | 56.8 | $R_1=+18.1$ | $T_1=4.2$ |
|   |        |      | $R_2=-51.0$ |           |
| 2 | 1.649  | 33.8 | $R_3=+44.5$ | $T_2=1.6$ |
|   |        |      | $R_4=-11.3$ | $S_1=21.7$ |
| 3 | 1.500  | 67.0 | $R_5=-58.3$ | $T_3=1.1$ |
| 4 | 1.605  | 43.6 | $R_6=-19.5$ | $T_4=1.1$ |

In this example, the diameter of the two lens elements of the front doublet is 18.9 mm., and the diameter of the two elements of the rear doublet is 12.9 mm. The diaphragm or stop is placed 13.0 mm. to the rear of the rear face of the second lens element. The lens has a back focal length or BF of 51.2 mm., and is adequately corrected for a maximum aperture of f:5.6 and a total angular field of 30°.

Some variations are possible without departing from the invention. However, for best results the variations should be kept within the limits as to powers and spacing already mentioned above.

The lens as herein disclosed, when made in a focal length of 12 inches, for use in an aerial camera having a negative size of 4½ x 4½ inches, gives excellent results.

What is claimed is:

A telephoto objective consisting of four lens elements grouped to form a positive meniscus doublet with its concave side toward the rear and a negative meniscus doublet with its concave side toward the front and arranged behind and axially alined with said positive doublet, the two lens elements of the positive doublet being cemented to each other, the two lens elements of the negative doublet being cemented to each other, the characteristics of the respective lens elements and their spatial relationship to each other being substantially in accordance with the data in the following table:

| Lens | N | V | Radii, mm. | Thicknesses, mm. |
|---|---|---|---|---|
| 1 | 1.5725 | 56.8 | $R_1=+18.1$ | $T_1=4.2$ |
|   |        |      | $R_2=-51.0$ |           |
| 2 | 1.649  | 33.8 | $R_3=+44.5$ | $T_2=1.6$ |
|   |        |      | $R_4=-11.3$ | $S_1=21.7$ |
| 3 | 1.500  | 67.0 | $R_5=-58.3$ | $T_3=1.1$ |
| 4 | 1.605  | 43.6 | $R_6=-19.5$ | $T_4=1.1$ | wherein the lens elements are numbered in order from front to rear in the first column, the corresponding refractive indices N for the D line of the spectrum are given in the second column, the corresponding dispersive indices V are given in the third column, the radii of curvature R of the lens surfaces are given in the fourth column, the respective surfaces being numbered from front to rear and being respectively identified by the subscript numeral used with each R, the axial thicknesses T of the respective lens elements and the axial thicknesses S of the air spaces between lens elements being given in the fifth column, the respective lens elements and air spaces to which the values of T and S apply being numbered from front to rear and being respectively identified by numerical subscripts used with T and S, the values of R, T, and S all being expressed proportionately in millimeters per 100 millimeters of equivalent focal length of the entire lens, the plus and minus values of R indicating curved surfaces which are respectively convex and concave toward the front of the lens.

References Cited in the file of this patent

UNITED STATES PATENTS

| | | |
|---|---|---|
| 873,898 | Rudolph et al. | Dec. 17, 1907 |
| 1,480,929 | Booth | Jan. 15, 1924 |
| 1,573,999 | Richter | Feb. 23, 1926 |
| 1,897,896 | Frederick et al. | Feb. 14, 1933 |
| 2,231,699 | Bennett | Feb. 11, 1941 |
| 2,346,312 | Kastilan | Apr. 11, 1944 |
| 2,421,927 | Cox | June 10, 1947 |
| 2,543,354 | Cook | Feb. 27, 1951 |